(12) United States Patent
Horn et al.

(10) Patent No.: US 9,195,666 B2
(45) Date of Patent: Nov. 24, 2015

(54) LOCATION INDEPENDENT FILES

(75) Inventors: Deric S. Horn, Los Gatos, CA (US);
Jeffrey D. Chung, Fremont, CA (US);
Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 13/351,987

(22) Filed: Jan. 17, 2012

(65) Prior Publication Data
US 2013/0185266 A1     Jul. 18, 2013

(51) Int. Cl.
*G06F 17/30* (2006.01)
(52) U.S. Cl.
CPC .... *G06F 17/30073* (2013.01); *G06F 17/30174* (2013.01); *G06F 17/30194* (2013.01)
(58) Field of Classification Search
CPC .................. G06F 17/30073; G06F 17/30174; G06F 17/30194; G06F 17/30371
USPC ......... 707/698, 736, 747, 770, 691, 706, 782, 707/784, E17.005, E17.01
See application file for complete search history.

(56) References Cited

U.S. PATENT DOCUMENTS

| 7,634,465 | B2 | 12/2009 | Sareen et al. | |
| 8,086,634 | B2* | 12/2011 | Mimatsu | 707/782 |
| 2004/0030731 | A1 | 2/2004 | Iftode et al. | |
| 2004/0117437 | A1 | 6/2004 | Frank | |
| 2009/0271454 | A1 | 10/2009 | Anglin et al. | |
| 2010/0138384 | A1* | 6/2010 | Rodriguez et al. | 707/609 |
| 2011/0016132 | A1 | 1/2011 | Okamoto | |
| 2011/0107182 | A1* | 5/2011 | Grube et al. | 714/763 |
| 2015/0134623 | A1* | 5/2015 | Liu | 707/692 |

OTHER PUBLICATIONS

"Bit Torrent," Jun. 19, 2007, pp. 1-6, XP055031616, Retrieved from the Internet: URL: http://eng.wikipedia.org/w/index.pho?title-Bit-Torrent&oldid=139216777.
PCT Application No. PCT/US2013/021375—International Search Report and Written Opinion dated May 14, 2013.
Ragib Hasan, Zahid Anwar, William Yurcik, Larry Brumbaugh, Roy Campbell, "A Survey of Peer-to-Peer Storage Techniques for Distributed File Systems," itcc, vol. 2, pp. 205-213, International Conference on Information Technology: Coding and Computing (ITCC'05)—vol. II, 2005.

* cited by examiner

*Primary Examiner* — Md. I Uddin
(74) *Attorney, Agent, or Firm* — Downey Brand LLP

(57) ABSTRACT

Managing data units by converting the data units into data segments and access files describing how to retrieve the data segments using hash values for the data segments. In a data store operation, the data unit is divided into data segments and an access file is generated. The access file includes segmenting scheme information for the data segments, hashing scheme information for the hash values, hash identification information describing the hash values, and location information identifying the locations at which the data segments are available. In a data retrieval operation, data from the data unit is retrieved by accessing the data segments and extracting the data therefrom, where the data segments are retrieved based on the access file for the data unit.

25 Claims, 9 Drawing Sheets

LOCATION INDEPENDENT FILES

FIELD

The following relates to file systems and more specifically relates to systems and methods for location independent files.

BACKGROUND

The wide use of electronic content has resulted in users requiring larger amounts of electronic storage to store such electronic content. However, it is generally not unusual for a user to accumulate an amount of electronic content that exceeds the capacity of a computing device. For example, the amount of electronic storage on a personal computer may be substantially larger than that of a portable media player. Accordingly, the user is required to limit the amount of electronic content transferred to the portable media player from the personal computer. Similar issues can arise when trying to synchronize the electronic content on two separate computing devices with dissimilar storage capacities.

One solution to such issues has generally been to allow additional storage to be added to the deficient device. However, adding storage to some types of devices is generally impractical or even impossible. For example, some types of portable media players may not be configured to allow their storage capacity to be expanded. In another example, the storage capacity of some computing devices, such as a portable or laptop computer can be expanded by attaching an external storage device, such as an external hard drive. However, this solution can be impractical, as the portability of the laptop computer may become limited.

Another solution to such issues has generally been to allow computing devices access to additional storage via a network connection. That is, a remote computing device is configured to allow a local computing device to utilize the storage capacity of the remote computing device. In operation, a file with electronic content can be stored on the remote computing device. The file is then utilized by the local computing device by transferring or copying the file from the remote computing device to the local computing device. The file can be permanently or temporarily stored on the local computing. However, this can result in significant lag time for access, as a user at the local computing device must wait for the entire file to be transferred prior to access. Further, in the case that the file is only temporarily stored on the local computing device, it would be necessary to update the remote computing system with any updates to the file. Again, this generally requires that the file on the local computing device be then transferred from the local computing device back to the remote computing device, adding additional lag time.

SUMMARY

Accordingly, the present technology provides systems and methods for managing and using electronic content at multiple locations. One aspect of the present technology is to provide data storage of electronic content. In particular, a data unit, representing one or more files of electronic content, is converted into a series of data segments stored at one or more locations (local or remote) and an access file. Each of the data segments represents a different portion of the data unit, is associated with a different hash value, and can be configured to allow high speed transmission thereof over a communication network.

The access file contains information regarding the data unit and the associated data segments. In particular, the access file includes metadata associated with the data unit, segmenting scheme information for the data segments, hashing scheme information for the hash values, locations of the data segments, and one or more hash identification values for determining the hash values of the data segments. The one or more identification values can, in some configurations, be generated by a hash of the hash values of the data segments. Alternatively, the values can also be the hash values themselves.

The present technology can then be used for data retrieval as follows. At a local system, rather than storing the data unit, the access file for the electronic content is stored instead and the local system is configured to service any requests for the data unit using the corresponding access file. Therefore, when access to the data unit is requested by a local system, the access file is utilized to determine what portion of the data unit is needed for fulfilling the request and to determine which of the data segments to retrieve. Further, based on the hashing information in the access file, the needed data segments are retrieved by identifying data segments providing matching hash values.

In the event that the usage of the data unit represented by the data segments is sufficiently high, the present technology allows for persistent storage of at least the most frequently used data segments. Alternatively, the data segments and the access file can be used to reassemble the data unit at the local system.

The present technology also allows for the generating of different versions of the data unit without requiring separate discrete copies of each version of the data unit to be generated. For example, when access to a data segment results in an updating of the data segment, the resulting hash value for the updated segment will be different than that of the original data segment. Accordingly, an updated data unit can be "created" simply by generating an updated access file representing a updated version of the data unit by providing new hash identification values based on the updated data segment.

The present technology can also provide enhanced file systems and methods therein. In general, the storage at a computing device generally consists of used and unused portions. The used portions are logically managed by the file system to provide a logical storage for data units stored on the local device. In the present technology, the file system is further configured to utilize the unused portions as storage for data segments retrieved from remote systems. That is, the access files are stored in the logical storage and are used to service requests for the associated data units, as previously described. Data segments are then stored in the unused space and accessed via their hash values. In the event that insufficient space is available for the data segments being retrieved, other data segments can be deleted or overwritten based on priority criteria. Additionally, the file system can be configured to manage the logical storage by data units to and from data segments based on some criteria.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
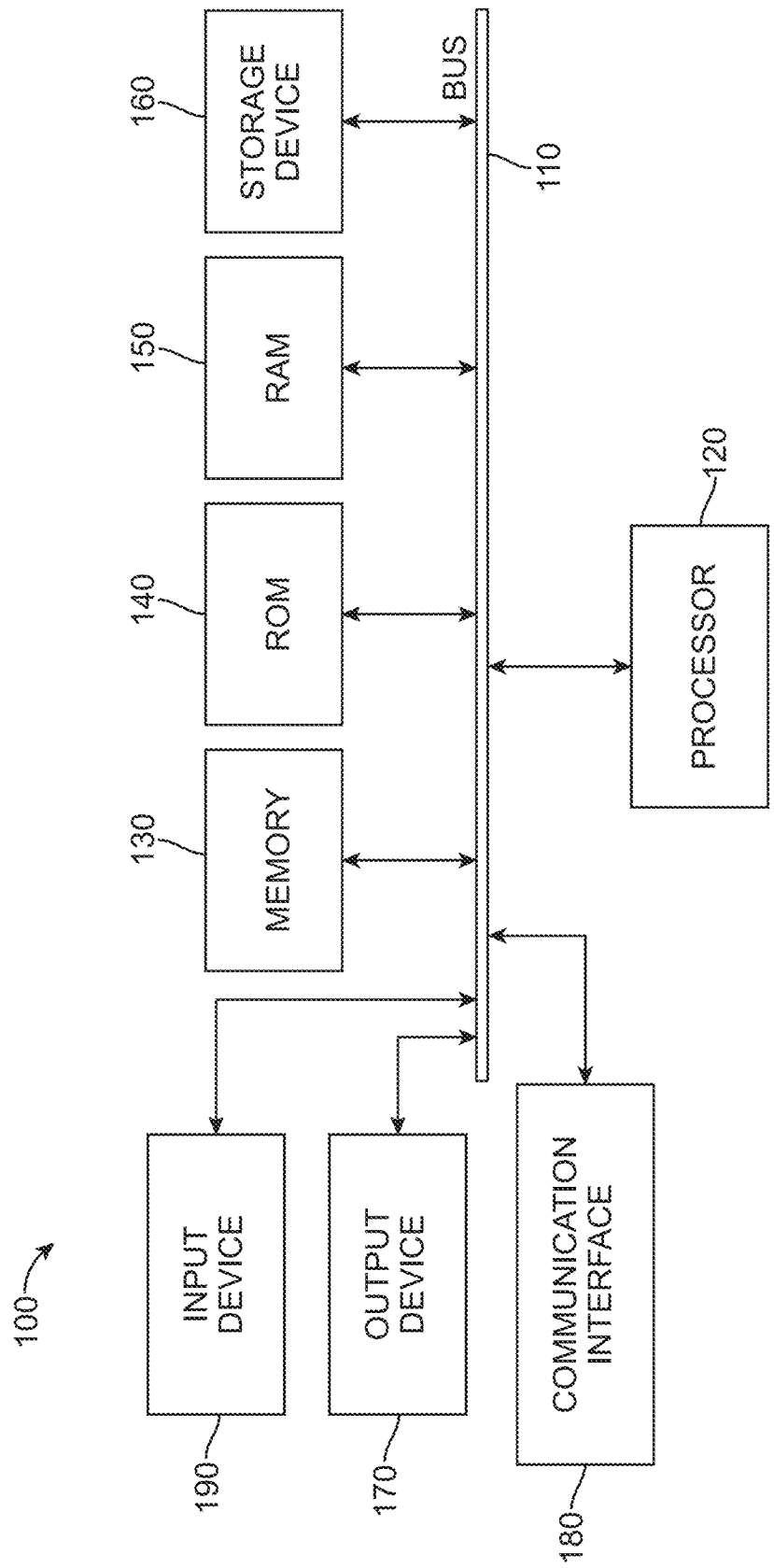
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive, a solid-state drive, or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed. For clarity of explanation, the exemplary system is presented as including individual functional blocks (including functional blocks labeled as a "processor"). The functions these blocks represent may be provided through the use of either shared or dedicated hardware, including, but not limited to, hardware capable of executing software. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
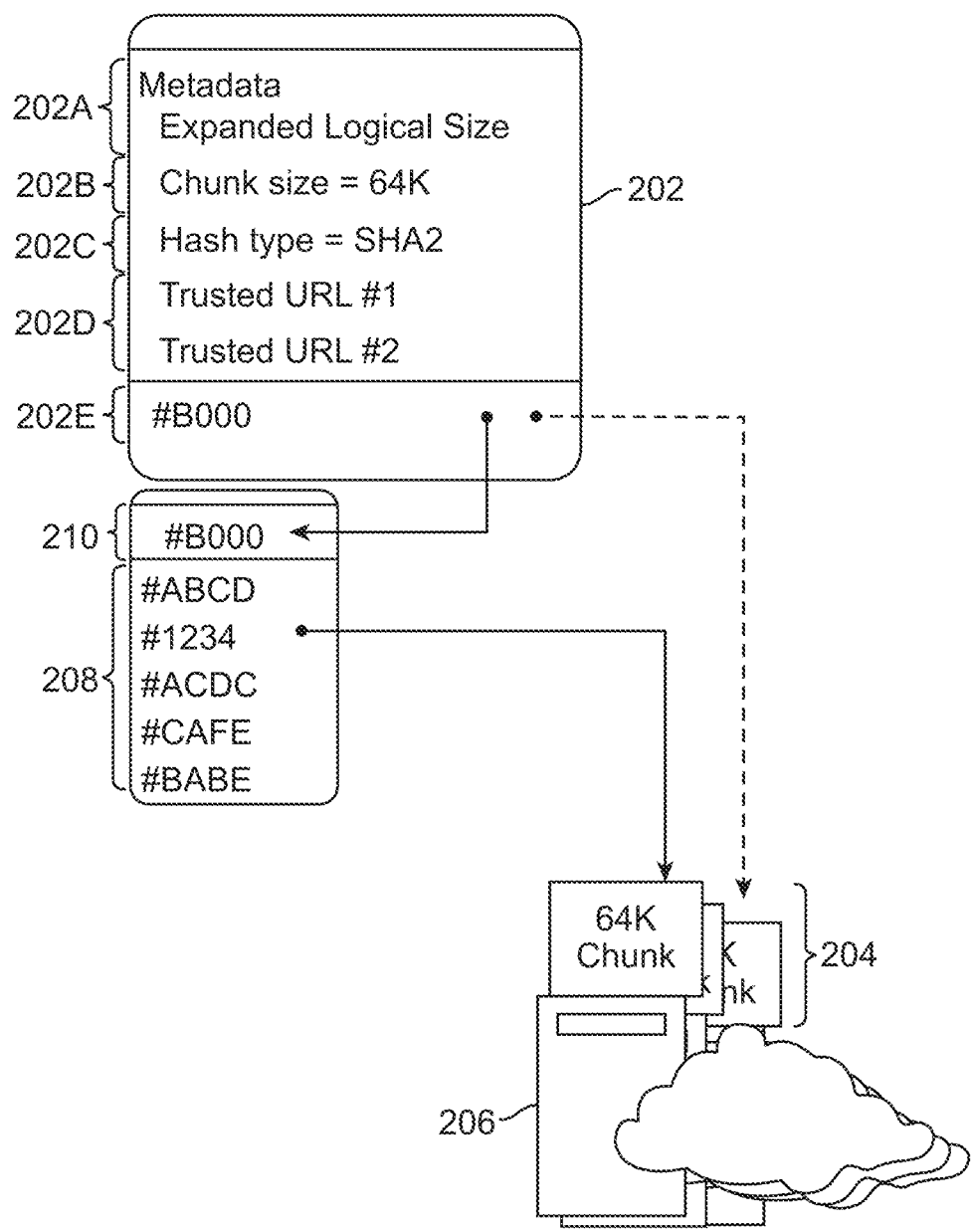
FIG. 2 is a schematic illustration of an embodiment of a configuration of an access file and associated data segments.

Now turning to FIG. 2, there is shown a schematic illustration of a configuration of an access file and associated data segments according to the present technology. As described above, one aspect of the present technology is to provide an alternate means for storing a data unit, representing one or more items of electronic content. The process for conversion of a data unit to data segments and an access file will be described in greater detail with respect to FIGS. 3 and 4. Referring back to FIG. 2, the result of the conversion of a data unit is a cloud or access file 202 and one or more data segments 204 stored at one or more locations 206.

An access file 202 is a data file consisting of a collection of data that indicates how to access the data unit via the data segments 204. For example, as shown in FIG. 2, the access file 202 can be configured to store metadata 202A associated with the data unit. As shown in FIG. 2, the metadata 202A can include an expanded logical size for the data unit. However, the present technology is not limited in this regard and the metadata 202A can also include any other type of metadata associated with the data unit. This metadata can include date information, user information, file type information, and attribute information, to name a few. However, metadata 202A can also include any other type of identifying information or less information than noted above. Further in the case that the data unit represents more than one item of electronic content, metadata for each item can also be included in the metadata 202A of the access file.

In addition to the metadata 202A, the access file can also include segmenting scheme information 202B. That is, any information describing the configuration of the data segments. For example, as shown in FIG. 2, the segmenting scheme information 202B can be the size of the data segments 204. Although the segmenting scheme information 202B in FIG. 2 shows that the data segments 204 are all of the same size, 64K, the present technology is not limited in this regard. In some cases, as described above, the size of the various data segments 204 can vary. Further, the segmenting scheme information 202B is not limited solely to size information. Rather, in some cases, the segmenting scheme information 202B can specify additional details regarding how the data segments 204 are constituted. For example, the data segments 204 could be configured as a packet or file that includes a payload portion consisting of the data associated with the data unit and other portions. The other portions can include portions for error checking, for indicating start and end positions within the data unit of the data in the data segment, the relationship of the data segment to other segments, and any other information. Accordingly, the segmenting scheme information 202B can specify the makeup of the data segments 204, so that data can be extracted from them correctly upon retrieval. Any other information specifying the structure and configuration of the data segments 204 can also be specified in the segmenting scheme information 202B.

As noted above, the sizing of the data segments can vary. However, in many configurations, the sizing of the data segments can be selected to provide fast and efficient access to the data segments. That is, the data segments can be sized so that they can be transferred between networked devices with little or no delay or lag. For example, the 64K segments described above can be transferred with relatively small bandwidth requirements. Additionally, the segment sizing can also be selected to take advantage of particular data storage or data packet configurations. That is, many types of memory devices and data packets are typically not configured to access data individually, but instead access a block that includes a specific amount of data. Accordingly, the present technology also allows for sizing the data segments to take advantage of the configuration for such blocks so as to maintain a highest possible throughput.

One aspect of the present technology is retrieving the data segments utilizing hash values associated with the data segments 204. Accordingly, in order to determine how to correctly determine hash values, the access file 202 can also include hashing scheme information 202C. In FIG. 2, the hashing scheme information 202C specifies a hash type of SHA2. However, the present technology is not limited in this regard and any other type of hashing scheme can be used in the present technology. Use of the hashing scheme will be discussed in greater detail below.

Although the description of the present technology will refer to the terms "hash", "hash value", "hash function", or the like, the use of these terms should not be considered limiting in any way. For example, a "hash function", as used herein, refers to any subroutine, algorithm, process, method, or the like, that provides a mapping or a transformation between a first data set of a first size and a second data set of a second size smaller than the first size.

An additional portion of the access file 202 is location information 202D. The location information 202D can specify the one or more locations 206 at which data segments 204 are located. In FIG. 2, the location information 202D is shown as a list of trusted uniform resource locator (URL) strings. However, the location information 202D can be in any format and can specify any type of resource at which the data segments 204 may be located. Additionally, in some configurations, the location information 202D can indicate a particular order for accessing the locations. For example, in the case where redundant versions of the data segments are to be stored at primary and secondary locations, the location information 202D can specify first accessing primary locations and accessing the secondary locations only when the data segments cannot be located at the primary locations.

Although the contents of the location information 202D can be fixed at the time of creation of the access files, in some configurations, the location information 202D can be updated over time. That is, in the event that storage locations for data segments are changed or otherwise adjusted, a computing system storing the access file 202 can be configured to receive such updates and automatically adjust the access file 202. Such adjustments can be global or on file-by-file basis. Additionally, the updates can also reflect the location of a computing device utilizing the access file 202. That is, the updates can reflect, based on the location of the computing device, storage locations that will result in improved access to the data segments associated with the access file 202.

The access file 202 can also include hash identification (hash ID) information 202E. That is information that directly or indirectly specifies the hash values for the data segments 204. In some configurations, the hash ID information 202E can specify a list of the hash values for the data segments. Alternatively, it may be preferable to limit the file size for the access file 202 or to provide access files with substantially the same size and contents. In such instances, the number of hash values associated with different data units could dramatically vary based on the size of the different data units. Accordingly, in some configurations, the hash ID information 202E can specify one or more composite hash values. That is, computing a hash value from the hash values associated with the data segments. For example, as shown in FIG. 2, for the hash values 208 associated with the data segments 204, a composite hash value 210 can be computed and used as the hash ID information 202E. Thus, during retrieval of data, the composite hash value 210 can be used to compute the hash values 208 in order to retrieve data segments 204.

As noted above, the data segments 204 could include information that specifies the relationship of each of the data segments 204 to another or its relationship to the data unit. However, this type of information could also or alternatively be stored via the composite hash value 210 in the present technology. That is, the composite hash value 210 can be utilized not only to identify the data segments 204, but also to determine the relationship between the various data segments 204. For example, when a data unit undergoes segmenting to generate the various data segments 204, there is a particular order, hierarchy, or the like, that defines how the content of the various data segments is arranged within the data unit. Therefore, to generate the composite hash value 210 the hash values 208 can first be arranged in an order corresponding to the relationship between the data segments 204 in the data unit. Alternatively, data representing the relationship can also be generated. Thereafter, the composite hash value 210 can be generated by obtaining a hash value of this structure of hash values 208 or the combination of hash values 208 and structure data. As a result, the composite hash value 210 not only stores the hash values 208, but also stores the relationship information for the various data segments 204. Consequently, separate information regarding the relationship between the data segments 204 needs to be stored within the access file 202 or the data segments 204, reducing further the size of the data segments 204 and the access file 202.

It is worth noting that in some configurations, the access file can include multiple composite hash values 210. The number of composite hash values 210 can be based on various factors. For example, if the data unit consists of multiple files or can be divided into portions along well-defined boundaries, a separate composite hash value 210 can be generated for each of these files or portions. As a result, if only one of these files or portions is needed, only the corresponding one of the composite hash values 210 would require processing to determine the associated ones of data segments 204.

Figure 3:
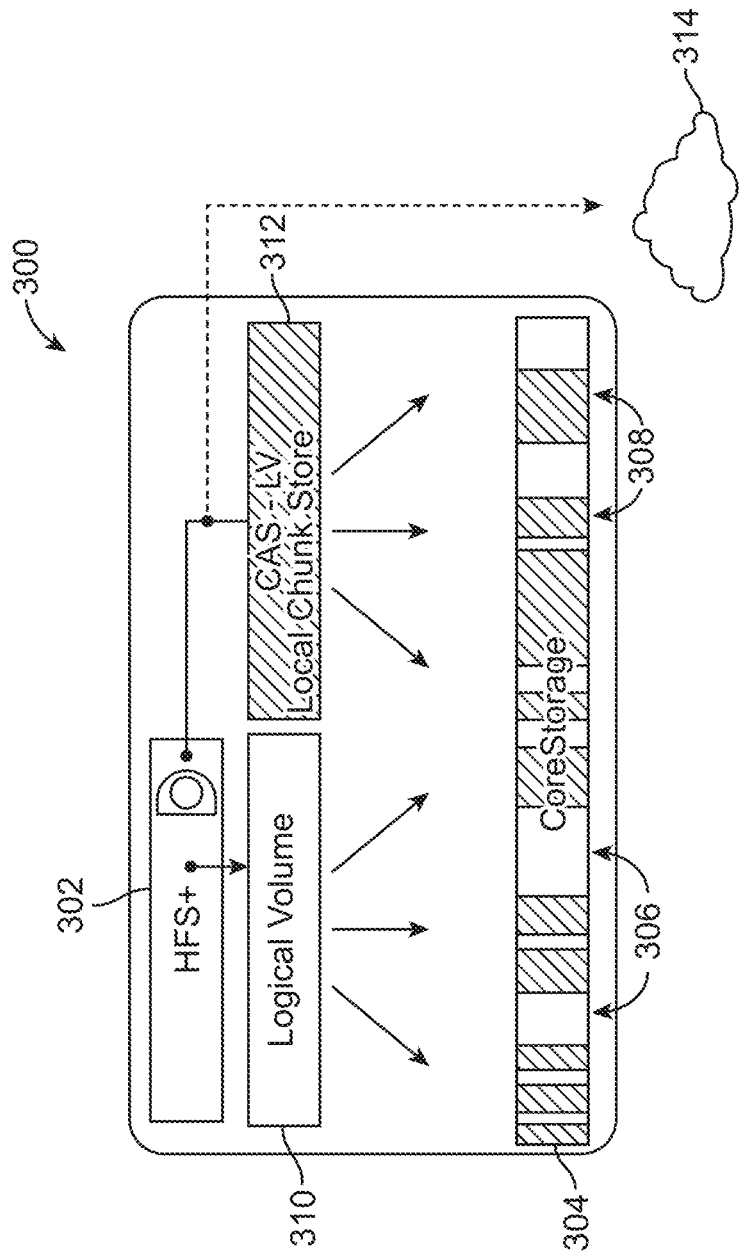
FIG. 3 is a schematic illustration of an embodiment of a computing system.

The storage configuration described above enables a new type of file system for managing data units. This is schematically illustrated with respect to FIG. 3. FIG. 3 is a schematic illustration of computing device 300 configured in accordance with the present technology.

As shown in FIG. 3, a computing device 300 includes a file system 302 and core storage 304 for storing data for the computing system 300 and that is managed by the file system 302. In FIG. 3, the file system 302 is indicated as a hierarchical file system plus (HFS+), however, the present technology is not limited in this regard and any other types of file systems can be used without limitation with the present technology.

In operation, the file system 302 manages the core storage 304 as two or more storage areas. In particular, the core storage 304 can be managed as one or more logical volume portions 306 (unhatched) and other portions 308 (hatched). The file system 302 manages the logical volume portions 306 to define a logical volume 310 for managing data units stored in the computing system. The logical volume 310 can be managed by the file system 302 in a substantially conventional manner to perform data retrieval and data storage.

The other portions 308 are used by the file system 302 to define a content addressable storage (CAS) 312 for managing and storing data segments at the computing device 300. To perform data retrieval and data storage, the file system 302 and CAS 312 operate as follows.

With respect to data retrieval, the present technology, as described above, allows a data unit to be represented by an access file and one or more data segments. Therefore, when such a data unit, or portions thereof, needs to be accessed by the computing device in response to a request, the file system 302 is configured to process the access file for the data unit and determine the data segments needed for the request.

In the present technology, the location of the access files can vary. In some configurations, the access files can be stored within computing device 300. Further, within computing device 300, the access files can be stored in one or more locations. For example, the access files can be stored within the logical volume 310 in one or more configurations. In one configuration, the access files are stored as additional files in the logical volume 310 alongside any data units stored therein. In another configuration, a portion of logical volume 310 or even a separate logical volume (not shown) can be set aside for the storage of the access files. However, the access files need not be stored within the logical volume. Rather, other data storage locations in computing device 300 can be used instead. For example, the file system 302 can have dedicated memory or a cache for storing the access files.

The file system 302, using this information, can then analyze or query the CAS 312 to determine whether or not the data segment is available therein. In some configurations, the analysis can be a scan of the CAS 312 to determine whether or not data segments are stored therein that include the hash values obtained based on the access file. In other configurations, the file system 302 can access a table maintained at the computing device 300 that includes a list of locations in the CAS 312 having data segments stored therein and hash values associated with each of the locations in the CAS 312. Thereafter, it is determined whether or not a data segment exists in the CAS 312 associated with the desired hash value.

If a data segment matching the hash value from the access file is not available in the CAS 312, the data segment can instead be retrieved from a remote storage 314 and placed in the CAS 312. The locating of data segments in remote storage 314 can be performed in a same or different way as the locating of data segments in CAS 312. Once the data segment is available in the CAS 312, data can be extracted from the data segment as needed. Once the CAS 312 is filled with data segments and additional data segments need to be retrieved, older or less frequently used data segments can be overwritten. Similarly, if a data unit needs to be added to logical volume 310 and the CAS 312 is filled with data segments, older or less frequently used data segments can be overwritten to allow the logical volume to expand. The process for retrieving and accessing data segments will be described below in greater detail with respect to FIG. 6.

With respect to data storage (i.e., converting a data unit in the logical storage 310 to an access file and data segments), the file system 302 is configured to process the data unit to generate the access file and the data segments. The data segments can then be copied to at least the CAS 312. Additionally, the data segments can be copied to the remote storage 314. The data unit in the logical storage 310 can then be deleted and the computing system 300 can then rely on the version of the data unit defined by the data access file and the data segments. The data storage process will be described below in greater detail with respect to FIGS. 4 and 5.

Turning now to FIGS. 4-8, there are provided various methods for utilizing the structure of the access files and data segments, as described above, to implement various features of file system for a computing device.

Figure 4:
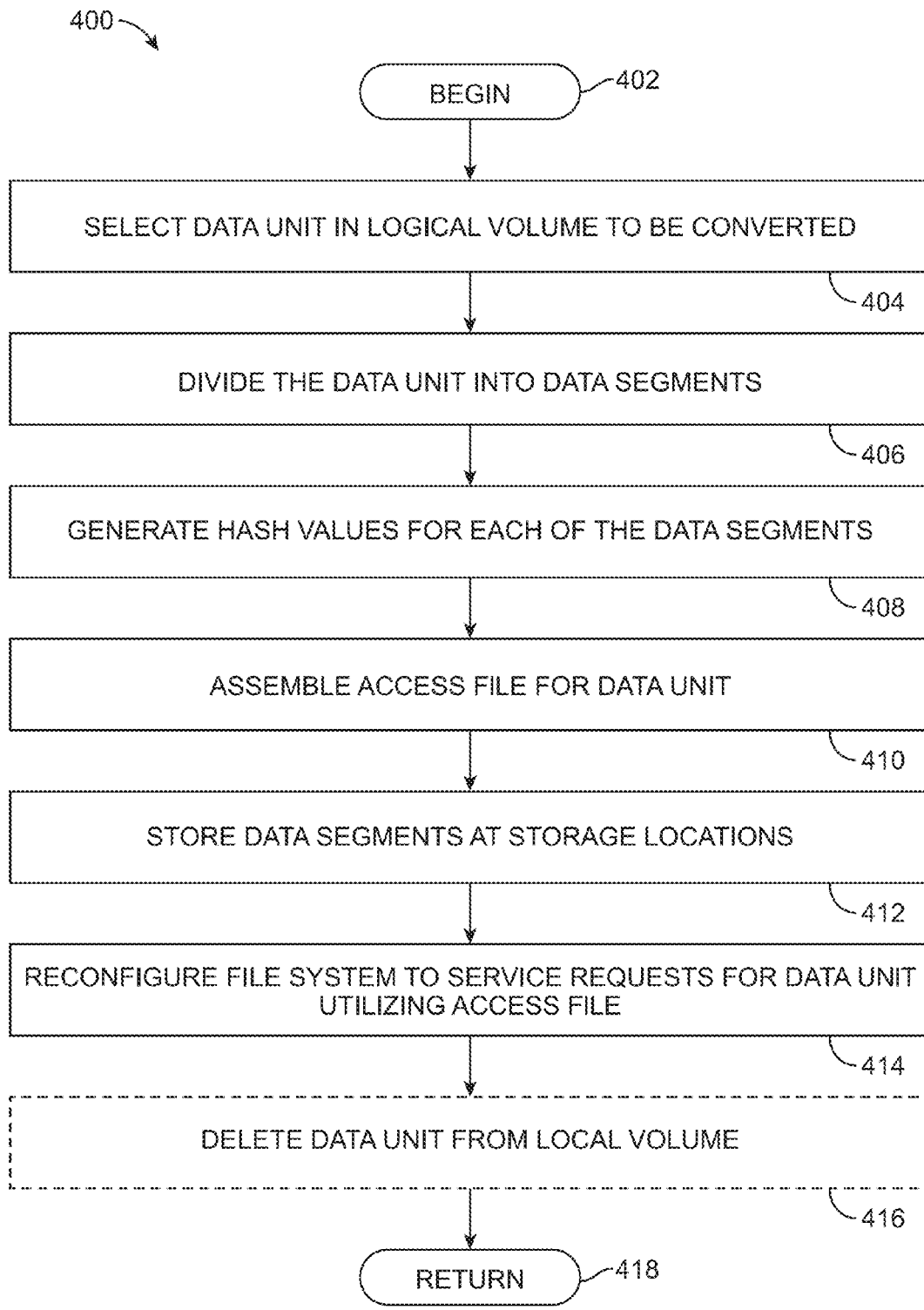
FIG. 4 is a flow chart of steps in an embodiment of a method for converting a data unit to an access file and associated segments.
Figure 5:
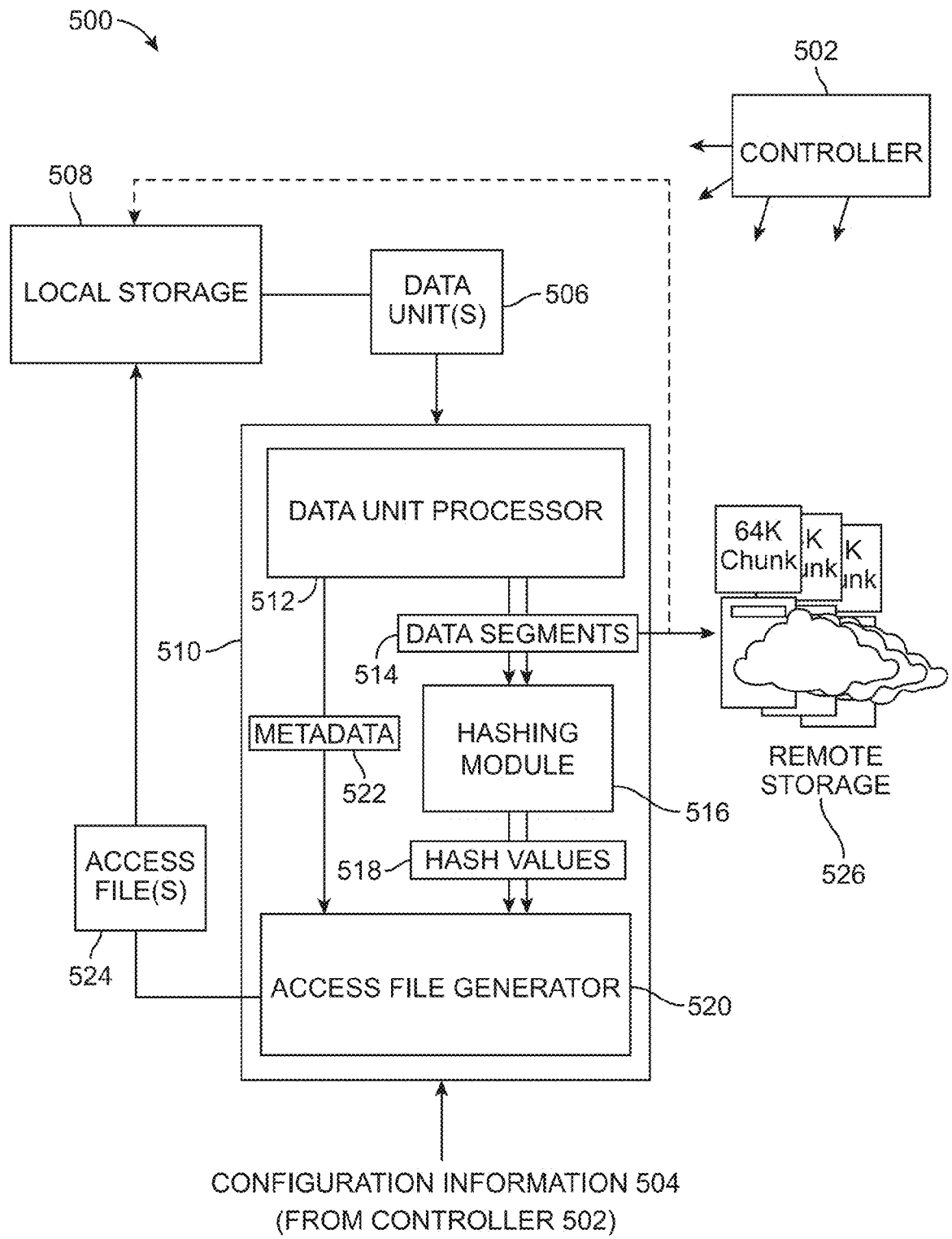
FIG. 5 is a schematic of an embodiment of a system for converting a data unit to an access file and associated segments.

First, an exemplary method and system for converting data units will be described with respect to FIGS. 4 and 5. FIG. 4 is a flow chart of steps in an exemplary method 400 for converting a data unit to an access file and associated data segments in accordance with the present technology. FIG. 5 is a schematic of an exemplary system 500 within a computing device, such as computing device 300 in FIG. 3, for converting a data unit to an access file and associated data segments and storage thereof. As shown in FIG. 5, a controller 502 can be provided to control and provide instructions or configuration information 504 to the components of system 500 to carry out method 400. The configuration information 504 can include the segmenting scheme information, the hashing scheme information, and the location information, as described above with respect to FIG. 2.

Method 400 begins at block 402 and proceeds to block 404. At block 404, the data unit to be converted can be selected. For example, as shown in FIG. 5, a controller 502 can determine that a particular data unit 506 in local storage 508 needs to be converted to an access file and data segments. In some configurations, the selection at block 402 can be an automatic selection based on one or more factors or criteria. Such criteria can include use, age, and size, to name a few. However, the present technology is not limited in this regard and the controller 502 can be configured to analyze any other factors or combinations of factors to identify data unit 506. In other configurations, the selection at block 404 can be a manual selection. That is, a user can identify data units in the local storage 508 directly. In still other configurations, a combination of automatic and manual identification of data unit 506 can be provided.

Once the data unit 506 is selected at block 404, method 400 proceeds with processing of the data unit, beginning with dividing the data unit 506 into data segments at block 406. For example, as shown in FIG. 5, the data unit 506 can be directed into a data unit processor 512 of a segmenting system 510 to generate data segments 514 based on the configuration information 504. The segmenting of the data unit 506 into the data segments 514 can be performed according to a variety of criteria. The criteria can be inherent in data unit processor 512, provided in configuration information 504, or a combination of both. For example, as discussed above, the criteria can specify a size for the data segments 514. The criteria can also specify the locations in the data unit 506 at which segmenting is to occur. For example, the criteria can specify that segmenting is to occur at each n number of bytes. Alternatively, the data unit 506 can be analyzed to determine logical segments or groups of segments for the data unit 506 based on functionality, criticality, or any other properties associated with different portions of the data unit 506. Additionally, the criteria can be dependent on the systems that will be utilizing and interacting with the data segments 514. For example, if a particular system or communications network operates more efficiently with data segments of a specific size or having a particular configuration, the data unit processor 512 can be configured to configure the data segments 514 to conform to this configuration. However, the present technology is not limited to any particular segmenting scheme and any type of segmenting scheme can be used.

After the data segments 514 are generated by data unit processor 512 at block 406, hash values for the data segments 514 can be generated at block 408. For example, as shown in FIG. 5, the segmenting system 510 can also include a hashing module 516 for generating hash values 518 for the various data segments 514. As previously described, any type of hashing scheme can be utilized in the present technology. However, to avoid the risk of collisions, a hashing scheme that provides substantially unique hash values can be used. An exemplary hashing scheme for such purposes is SHA2.

Once the hash values 518 are computed at block 408 by the hashing module 516, an access file can be generated or assembled at block 410. In particular, the segmenting system 510 can include an access file generator 520 to generate access files. The access file generator 520 can combine the hash values 518, along with metadata 522 for the data unit 506, and the configuration information 504 to generate an access file 524 for the data unit 506 and the data segments 514.

The metadata 522 can be obtained in several ways. For example, as shown in FIG. 5, the data unit processor 512 can be configured to extract the metadata 522 from the data unit 506 and forward the metadata 522 to the access file generator 520. However, the present technology is not limited in this regard and any other methods, inside or outside of segmenting system 510 can be used to obtain the metadata 522.

With respect to the hashing scheme information, the segmenting scheme information, and location information to be included in the access file 524, these can be obtained by the access file generator 520 from the configuration information 504. Alternatively, the module or units in segmenting system 510 utilizing such information can also forward this information to the access file generator 520.

Following or concurrently with blocks 408 and 410, the data segments 514 can be stored at block 412. The locations at which the data segments 514 are stored can include local storage 508, a remote storage 526, or a combination of both. In some configurations, the data segments 514 are always stored in the remote storage 526 to provide an archival copy in case it is necessary to overwrite the data segments 514, as previously described with respect to FIG. 3.

As noted above, the access file 524 generated at block 410 will include location information. In configurations where at least some the data segments 514 are stored in the local storage 508, the local storage 508 can be identified in the access file 524 so that a local system will know to look in the local storage 508 for the data segments 514. However, in some configurations, the local system (i.e., the file system) can be configured to check the local storage 508 for the data segments 514. Accordingly, the access file generator 520 can be configured to exclude the local storage 508 from the locations in the access file to further reduce the size of the access file 524.

Once the data segments 514 are stored at block 412 and the access file 524 is assembled at block 410, the method 400 can proceed to block 414. At block 414 the local system can be reconfigured to service any requests for the data unit 506 using the access file 524. This process can include storing the access file 524 in the local storage 508 or other storage in the local system and configuring a file system for the local system to access data for the data unit via the access file 524. Optionally, the data unit 506 can be deleted or purged from the local storage 508 at block 416. Thereafter, method 400 resumes previous processing at step 418, which can include repeating method 400.

Figure 6:
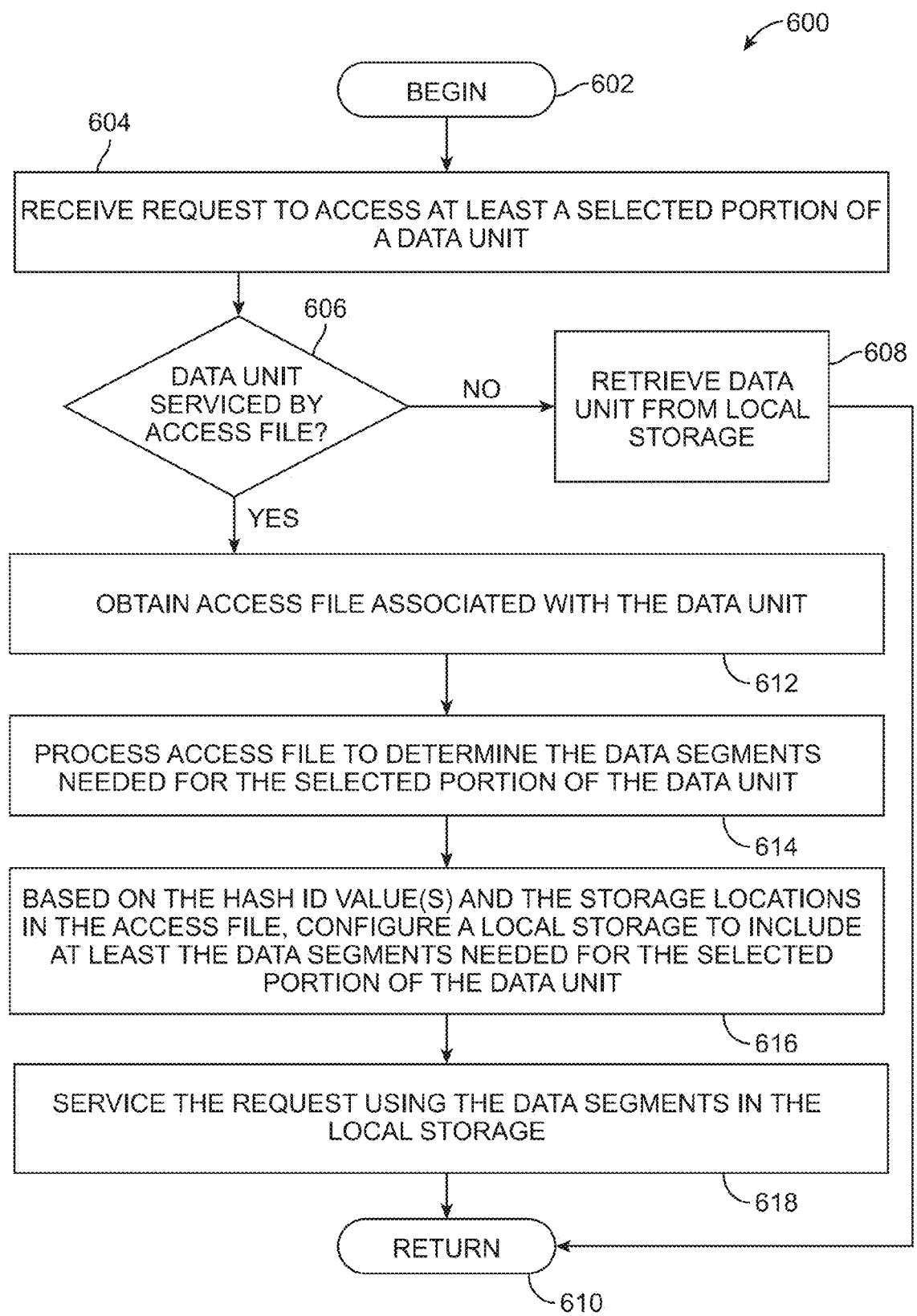
FIG. 6 is a flow chart of steps in an embodiment of a method for accessing a data unit using an access file and associated segments.

FIG. 6 is a flow chart of steps in an exemplary method 600 for accessing a data unit using an access file and associated data segments in accordance with the present technology. The method 600 begins at block 602 and continues on to block 604. At block 604, a request to access at least a selected portion of a data unit is received. That is, depending on the application or the request, only a portion of the data unit may be needed. In a typical computing device, a request for a data unit in the local system is serviced by one or more file systems managing the data storage devices for the local system. Accordingly, block 604 can include the forwarding of the request for selected portions of the data unit to the file system.

Once the request is received by the file system at block 604, the file system can determine how a request for a data unit should be serviced at block 606. That is, the file system can determine whether or not it has been configured to service requests associated with the data unit using an access file and data segments at block 606. If the file system has not been configured thusly, the method can proceed to block 608 and the data unit can be retrieved from the local storage using conventional methods. Thereafter, the method 600 can proceed to block 610 and resume previous processing, including repeating method 600.

If at block 606, it is determined that the file system is configured to service requests for the data unit utilizing an access file, the method 600 can proceed to block 612. At block 612, the access file for the data unit requested can be obtained or accessed. In the present technology, the location of the access unit can vary. In some configurations, the access file can be stored within a local storage of the local system, either with data units residing on the local system or in a specialized location, such as a dedicated memory location. For example, the local system can include a cache or other reserved memory area for storing access files. Alternatively, the access files can also be stored in one or more remote locations. In such configurations, the file system can be configured at block 612 to access the remote locations upon receipt of a request and make a permanent or temporary copy of the access file in order to service the request.

Once the access file is obtained at block 612, processing of the access file can begin at block 614 to obtain the data segments needed for servicing the request. For example, the access file can be processed at block 614, based on the request, to identify the particular data segments that will be responsive to the request and their corresponding hash values. For example, the metadata information and the segmenting scheme information in the access file can be utilized to determine which of the data segments are associated with the request. Afterwards, the segmenting scheme information and the hash ID information can then be used to determine the hash values for the identified data segments. In the case where the entire data unit is needed, the hash values for all of the data units are obtained. However, in the case where only a portion of the data segments are needed, only the hash values for those segments need be retrieved. However, the present technology is not limited in this regard. That is, any number of hash values can be obtained, as long as they include the hash values for the data segments needed to service the request.

One of the advantages of this configuration is that at many times a user typically requires access to a particular portion of a data unit and does not require immediate access to the complete data unit. For example, in the case of a data unit consisting of an audio or video content, it may only be necessary to provide access to the portions of the data unit corresponding to the portion of the audio or video content currently being displayed plus some additional portions (e.g., to provide some buffering of the content). Accordingly, the present technology permits identification of these portions of the data unit and the associated data segments.

After the data segments are identified and their hash values are obtained at block 614, a local storage can be configured to provide access to the identified data segments at block 616. This block can include first performing a search in various storage locations to determine locations of the identified data segments. In particular, this involves comparing the hash values for the identified data segments to hash values for the data segments available at the various storage locations. In some configurations, the hash values of the data segments at the various locations can be computed dynamically. In other configurations, the hash values of the data segments at the various storage locations can be pre-computed. In such configurations, these hash values can be stored in a data file separate from the data segments or embedded within the data segments.

With respect to the locations searched, the locations can include at least the locations specified within the access file. However, the locations searched can also include other locations. For example, storage locations within the local system can also be searched. However, the present technology is not limited in this regard and the method 600 can be configured to include any other default locations for searching, including local and remote locations. Further, as previously noted, the locations can be searched in a pre-defined order, as specified in the access file or in the local system.

In addition to performing the search described above, block 616 can also involve configuring the local storage to include the identified segments by permanently or temporarily making copies of the identified segments in the local system. In the present technology, the location for storing the identified segments in the local system can vary. In some configurations, the identified segments can be stored within a local storage of the local system, either with data units residing on local system or in a specialized location, such as a dedicated memory location. For example, the local system can include a cache or other reserved memory area for storing the identified segments.

After the local system has been configured to include the identified data segments at block 616, the method proceeds to block 618. At block 618, the request can then be serviced using the data segments in the local system. That is, data can be extracted from the data segments to provide the data for the request without the need for having the entire data unit available. Method 600 can then continue on to block 610 and resume previous processing, including repeating method 600.

Figure 7:
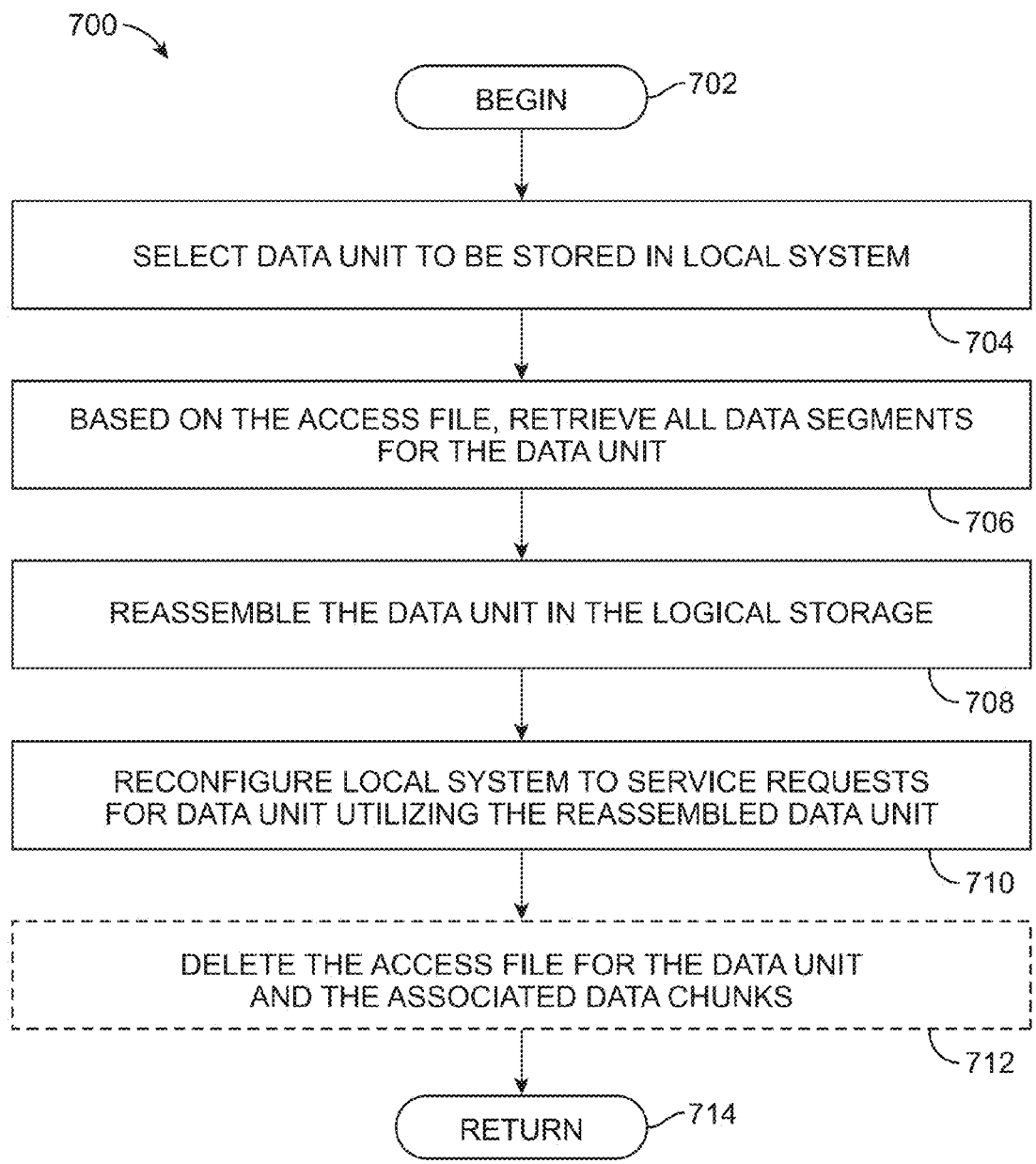
FIG. 7 is a flow chart of steps in an embodiment of a method for converting an access file and associated segments to a data unit.

As discussed above with respect to FIG. 6, it is possible to service a request using data segments in the local storage. However, in cases where a substantial portion of the data unit is frequently being accessed via the data segments, it can be more efficient to reassemble the data unit in the local system. This process is shown in FIG. 7. FIG. 7 is a flow chart of steps in an exemplary method 700 for converting an access file and associated data segments to a data unit in accordance with the present technology. Method 700 begins at block 702 and continues to block 704.

At block 704, a data unit to be stored at the local system is selected. As discussed above, the data unit can be selected based on usage criteria, such as the frequency of use of the data segments associated with the data unit. However, the present technology is not limited in this regard and any other criteria can be used to select the data unit. For example, if additional space is available at the local system, one or more data units can be stored locally instead of via the data segments. In another example, the data unit needs to be archived or a copy needs to be made, it can be necessary to assemble the data unit. Any other criteria for selecting a data unit can also utilized in the present technology.

After the data unit is selected at block 704, all of the data segments for the data unit can be retrieved at block 706. This can be performed in substantially the same way as described above with respect to FIG. 6. Thereafter, once all the data segments are available at the local system, the data segments can be used to reassemble the data unit at block 708. In particular, the segmenting scheme information, the metadata, and other information in the access file can be used, in combination with any information present in the data segments, to place the data segments in the correct arrangement so to reassemble the data unit.

Once the data unit has been reassembled at the local system at block 708, the local system can then be reconfigured at block 710. That is, if the reassembled data unit is to be maintained at the local system, the local system can be reconfigured at block 710 to service future requests for utilizing the data unit using the reassembled data unit.

Optionally, after the local system is reconfigured at block 710 to utilize the reassembled data unit, the access file and the associated data chunks can be deleted at block 712. In some cases, this can involve deleting the access file and the associated data chunks at the local system. Such a configuration therefore maintains an archival copy of the data unit in the remote systems. Alternatively, block 712 can involve deleting the access file and the associated data chunks at both the local system and at one or more remote systems. As a result, the archival copy of the data unit in the remote systems can be deleted. However, in some cases, the deletion can be limited to non-archival remote systems in other to provide a backup copy of the file if the data unit is inadvertently deleted from the local system or if a "clean" copy of the data unit is later needed at the local system.

Figure 8:
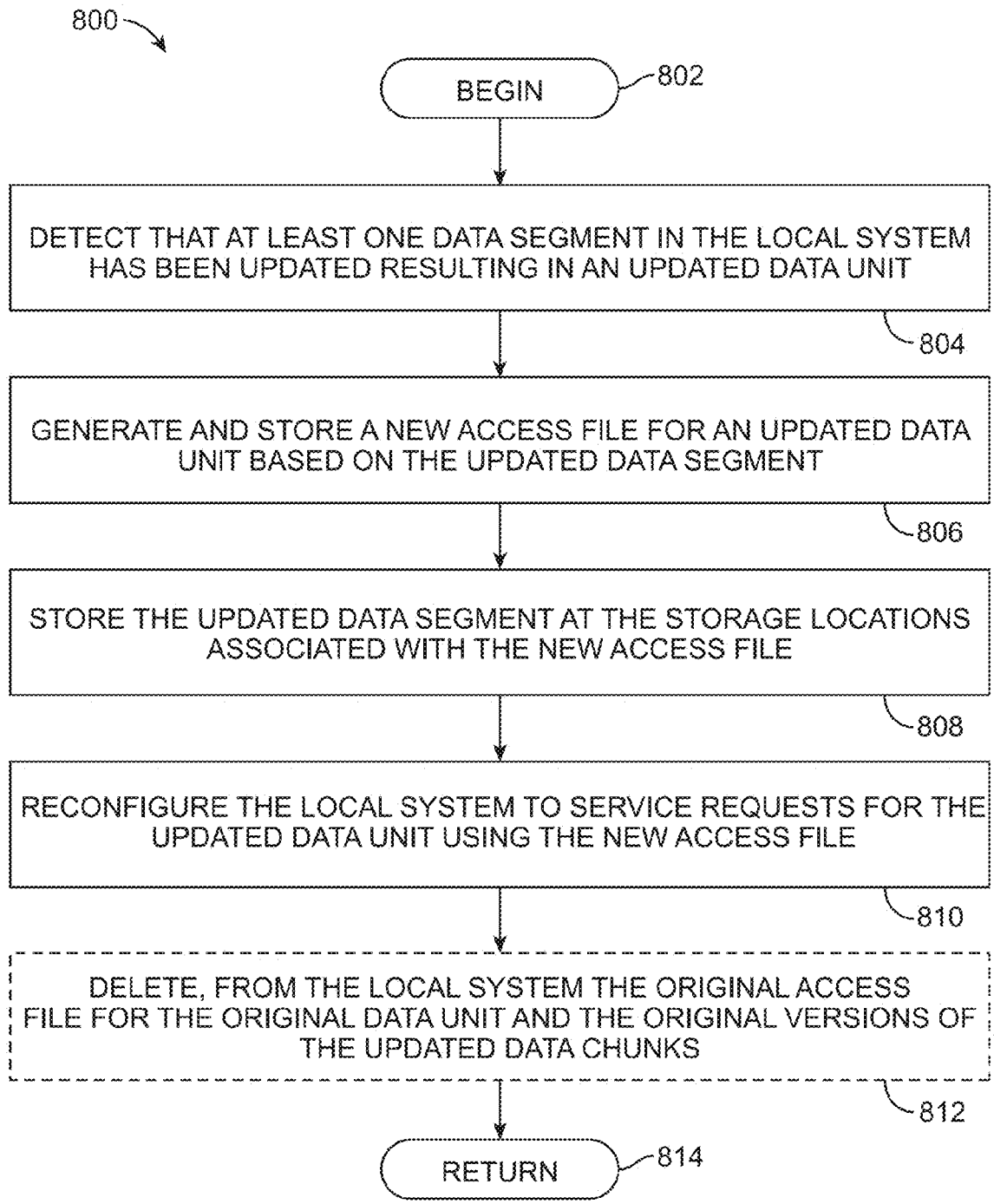
FIG. 8 is a flow chart of steps in an embodiment of a method for generating different versions of a data unit.

As described above, a file system configured in accordance with the present technology provides a document versioning system that utilizes a reduced amount of space as compared to conventional methods. Operation of this versioning system is shown below with respect to FIG. 8. FIG. 8 is a flow chart of steps in an exemplary method 800 for generating different versions of a data unit in accordance with the present technology.

Method 800 begins at block 802 and proceeds to block 804. At block 804, the file system detects that at least one data segment copied to the local system has been updated. For example, the file system can detect that a user has issued a command to change data within the data segment. Alternatively, the file system can detect that the hash value for the data segment no longer matches the hash value according to the access file. Any other methods for detecting a change in the data segment can also be used without limitation.

Once a change in a data segment is detected at block 804, the method 800 proceeds to block 806 to generate a new version of the data unit. In particular, at block 806, the file system utilizes the updated data segment(s) to generate an updated access file. The updated access file is substantially similar to that associated with the original data segment. However, the updated access file is generated to include information regarding the hash value for the updated data segment (s). Further, the metadata or other information for the updated access file can be adjusted to reflect that the updated access file refers to a different version of the data unit in the original access file. For example, the updated access file can further include information that refers back to the original access file.

In some cases, rather than generating a complete access file in response to the updated data segment, the updated access can be configured to include information indicating how to generate the new version of the data unit based on the updated data segment(s) and the information in the original access file. That is, the updated access file can be configured to include information identifying the original access file and information identifying the changes needed in the original access file to obtain the data segments for accessing the new version of the data unit.

Regardless of the configuration of the updated access file, once the updated access file is generated at block 806, the method 800 proceeds to block 808. At block 808, the updated data segments can be stored at the storage locations associated with the access file for future access. Block 808 can also include storing the updated access file at a remote location in a shared environment. That is, storing the access file at a storage location accessible by other users so that other users can access the updated data unit via the updated data segments.

Following or concurrently with block 808, the method 800 can perform block 810. At block 810, the local system can be reconfigured so that the local system services requests for the new version of the data unit using the updated access file. Following blocks 808 and 810, the method 800 can optionally proceed to block 812. At block 812, the original access file can be deleted from the local system if the original data unit is not to be further used at the local system. For example, if the user's intent at the local system is to overwrite the original data unit. Similarly, if only the updated data segment(s) are to be used, the original data segments can be deleted from the local system. Finally, the method 800 can proceed to block 814 and resume previous processing, including repeating method 800.

Although various embodiments been described above that provide a methodology for expanding the capacity of a local storage by using the data segment schemes described above, the present technology is not limited in this regard. In some embodiments, the use of data segments can also be utilized to enhance the performance of a local system.

In many instances a computing device can consist of various types of memory devices with various data transfer rates, access speeds, or other data access metric with respect to reading or writing data to the memory devices. For example, solid state storage devices, such as solid-state drives, typically have significantly higher access speeds than magnetic storage devices, such as hard disk drives with magnetic heads. However, the cost per megabyte of solid state drives is typically significantly higher than the cost per megabyte of hard disk drives with magnetic heads. Accordingly, hard disk drives with magnetic heads still remain the primary storage medium in many types of computing devices.

However, it is worth noting that in many cases, the amount of data in use by a computing device is typically significantly less that the total storage capacity of hard disk drives with magnetic heads. Accordingly, one aspect of the present technology is to leverage the use of data segments to provide an efficient composite storage. The operation and configuration of such a composite storage device is described below with respect to FIG. 9.

Figure 9:
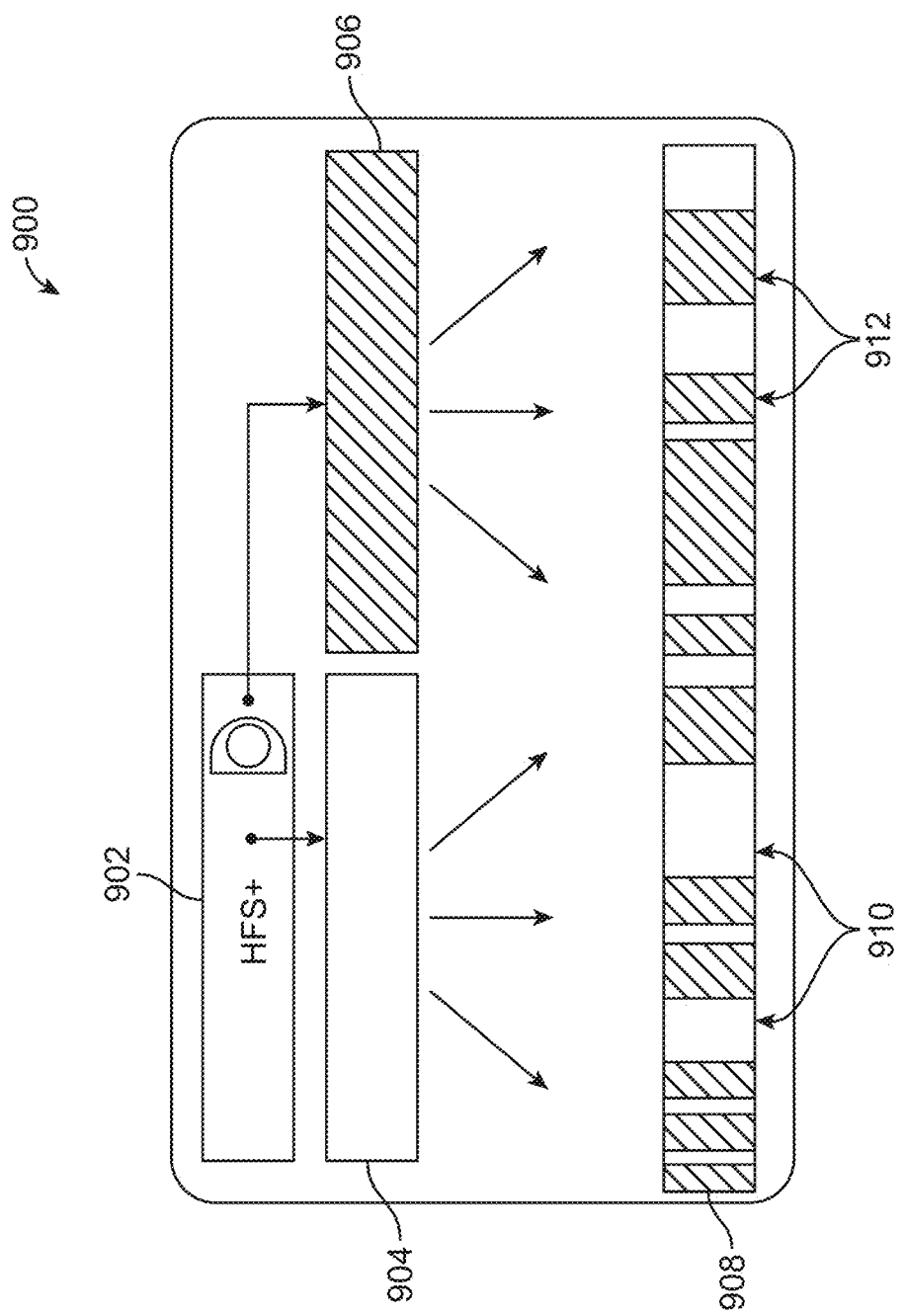
FIG. 9 is a schematic illustration of an alternate embodiment of a computing system.

FIG. 9 is a schematic illustration of computing device 900 configured in accordance with an alternate embodiment of the present technology. As noted above computing device 900 can consist of a file system 902 managing a first physical device 904 and a second physical device 906. For illustrative purposes, the first physical device 904 is a storage volume with a high access speed and low storage capacity and the second physical device 906 is a storage volume with a low access speed and a high storage capacity. For example, the first physical device 904 can be a magnetic disk drive and the second physical device 906 can be a solid-state disk drive.

Although the exemplary embodiment of FIG. 9 is described with respect to a file system, this is solely for ease of illustration. However, the control of multiple store device described herein can be implemented at the file system level, a volume manager level, or even at a device driver level in substantially the same manner without limitation.

In operation, data can be stored locally by computing device 900 in second physical device 906 in segmented form. The generation and storage of such data segments can occur according to any of the methods described above, where the second physical device 906 operates in substantially a same manner as the remote storage devices described above. As a result, the file system 902 can be configured to associate a particular data unit with a particular series of data segments stored in second physical device 906.

In a conventional system, if computing device 900 thereafter requests at least a portion of a data unit, the computing device 900 would simply access the appropriate data segments in second physical device 906. However, in the various embodiments, instead of providing such access, the appropriate data segments are instead copied to the first physical device 904. Further, the file system 902 is reconfigured so that future requests for the copied data segments are serviced by the first physical device 904. As a result, the first and second physical devices 904 and 906 operate as a single logical storage device 908, where data segments are retrieved from one of devices 904 and 906 depending on whether a copy of a data segment has been created at the first physical device 904. For example, the file system 902 can be configured to access data segments associated with data units 910 from first physical device 904 and to access data segments associated with data units 912 from second physical device 906.

More importantly, since a computing device typically accesses a large number of data units repeatedly, the accessing of corresponding data segments via the faster, first physical device 904, will also result in overall enhanced performance for the computing device 900.

In the event that the storage capacity of the first physical device 904 is used up, the data segments stored thereon can be overwritten or deleted. As described above, any type of scheme can be utilized to select which data segments can be deleted or overwritten. In such cases, if no modification of the data segment has occurred in the first physical device 904, the data segment can simply be overwritten or deleted and the file system 902 can be reconfigured to provide access to the data segment via the second physical device 906. If a modification of the data segment has occurred in the first physical device 904, the data segment in the first physical device 904 can be used to overwrite the corresponding data segment in the second physical device 906. Although copying data segments back the second physical device 906 could affect performance, in a typical computing device a substantial portion of data being accessed (~90% or greater) typically remains unmodified. Accordingly, in most cases additional copy operations are not needed and the deletion/overwriting of a data segment will generally consist of solely an operation to update the file system.

Alternatively, the modified data segment from the first physical device 904 and the corresponding data segment in the second physical device 906 can be both maintained in the second physical device 906. In such cases, this arrangement can be utilized by the file system 902 to store different versions of a data unit, as previously described. The present disclosure also contemplates that responsive to modification of a data segment in the first physical device 904, the modified data segment can be automatically copied to the second physical device 906 to provide storage of different versions of a data unit without deleting the data segment from the first physical device 904.

Although the exemplary embodiment of FIG. 9 is described with respect to differences in access speed, a composite storage device according to the present technology can be based on devices with differences in an data access metric, including data transfer rates, access speeds, or any other metric of interest.

The present disclosure contemplates that the composite storage scheme described above with respect to FIG. 9 can be used in isolation or in conjunction with any of the techniques described above. That is, data segments can be utilized on a local-local basis, a remote-local basis, or both.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, solid-state disk storage, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A method, comprising:
    selecting a data unit stored at a local system for conversion to one or more data segments and an access file associated with the data unit, wherein the data unit is automatically selected based on one or more selection criteria selected from an access frequency of the data unit, an age of the data unit, or a size of the data unit;
    processing the data unit stored at the local system to generate the one or more data segments and the access file associated with the data unit, wherein each data segment of the one or more data segments represents a different portion of the data unit, and the one or more data segments are generated based on the following segment generation criteria: a size criteria that specifies a size for the one or more data segments, and a segmenting criteria that specifies a number of bytes at which the data unit is to be segmented to generate each data segment of the one or more data segments;
    storing the one or more data segments at one or more locations;
    computing a hash value for each data segment of the one or more data segments;
    assembling the access file, the access file comprising:
        metadata for the data unit,
        segmenting scheme information that specifies a configuration of the one or more data segments,
        hashing scheme information that specifies a type of hashing scheme used for the hash value associated with each data segment of the one or more data segments,
        hash identification information describing the hash value associated with each data segment of the one or more data segments, and location information identifying the one or more locations of one or more resources at which the one or more data segments are located, wherein the one or more locations are specified by one or more trusted uniform resource locator (URL) strings;

reconfiguring a file system associated with the local system to service a request for the data unit by utilizing the access file and the one or more data segments, wherein, prior to the reconfiguring, the file system was configured to service the request for the data unit without utilizing the access file; and deleting the data unit from the local system.

2. The method of claim 1, wherein the location information indicates an order for accessing the one or more locations.

3. The method of claim 1, wherein each data segment of the one or more data segments is configured to be of a same size.

4. The method of claim 1, wherein the hash identification information comprises at least one composite hash value that is computed based on the hash value associated with each data segment of the one or more data segments.

5. The method of claim 4, wherein the at least one composite hash value stores relationship information associated with the one or more data segments, and the relationship information describes an arrangement of the one or more data segments within the data unit.

6. A system, comprising:
a computing device comprising a file system, wherein the file system is configured to control the computing device to perform steps that include:
selecting a data unit stored at the computing device for conversion to one or more data segments and an access file associated with the data unit, wherein the data unit is automatically selected based on one or more selection criteria selected from an access frequency of the data unit, an age of the data unit, or a size of the data unit;
converting the data unit stored in the computing device into the one or more data segments and the access file associated with the data unit, wherein the one or more data segments are generated based on the following segment generation criteria: a size criteria that specifies a size for the one or more data segments, and a segmenting criteria that specifies a number of bytes at which the data unit is to be segmented to generate each data segment of the one or more data segments;
storing the one or more data segments in one or more locations;
computing a hash value for each data segment of the one or more data segments;
assembling the access file for servicing a request for the data unit, the access file comprising:
metadata for the data unit,
segmenting scheme information that specifies a configuration of the one or more data segments,
hashing scheme information that specifies a type of hashing scheme used for the hash value associated with each data segment of the one or more data segments,
hash identification information describing the hash value associated with each data segment of the one or more data segments, and
location information identifying the one or more locations of one or more resources at which the one or more data segments are located, wherein the one or more locations are specified by one or more trusted uniform resource locator (URL) strings;

reconfiguring the file system to service the request for the data unit by utilizing the access file and the one or more data segments, wherein prior to being reconfigured, the file system was configured to service the request for the data unit without utilizing the access file; and deleting the data unit from the computing device.

7. The system of claim 6, wherein the one or more locations comprise one or more remote storage locations accessible by the computing device via a communications link.

8. The system of claim 6, wherein the computing device comprises a dedicated storage managed by the file system for storing the access file.

9. The system of claim 6, wherein the data unit is deleted from the computing device in response to the storing of the one or more data segments and the assembling of the access file.

10. A non-transitory computer-readable medium configured to store instructions that, when executed by a processor included in a computing device, cause the computing device to carry out steps that include:
in response to a request at the computing device to access at least a portion of a data unit, determining whether a file system associated with the computing device is configured to service the request for the portion of the data unit by utilizing an access file and one or more data segments corresponding to the data unit instead of retrieving the data unit from the computing device, wherein:
the data unit is automatically selected for conversion to the one or more data segments based on one or more selection criteria selected from an access frequency of the data unit, an age of the data unit, or a size of the data unit, and
the one or more data segments are generated based on the following segment generation criteria: a size criteria that specifies a size for the one or more data segments, and a segmenting criteria that specifies a number of bytes at which the data unit is to be segmented to generate each data segment of the one or more data segments; and
in response to a determination that the file system is configured to service the request for the portion of the data unit by utilizing the access file and the one or more data segments corresponding to the data unit:
obtaining the access file corresponding to the data unit, wherein the access file comprises:
metadata for the data unit,
segmenting scheme information that specifies a configuration of the one or more data segments,
hashing scheme information that specifies a type of hashing scheme used for a hash value associated with each data segment of the one or more data segments,
hash identification information describing the hash value associated with each data segment of the one or more data segments, and
location information identifying one or more locations of one or more resources at which the one or more data segments are located, wherein the one or more locations are specified by one or more trusted uniform resource locator (URL) strings,
processing the access file to identify at least one data segment from the one or more data segments corresponding to the portion of the data unit to yield at least one identified data segment, based on the hash value associated with the at least one identified data segment and the location information in the access file, configuring a local storage of the computing device to comprise the at least one identified data segment, and servicing the request using data extracted from the at least one identified data segment in the local storage, wherein, prior to being configured to service the request by utilizing the access file and the one or more data segments, the file system was configured to service the request without utilizing the access file.

11. The non-transitory computer-readable medium of claim 10, wherein obtaining the access file further comprises retrieving the access file from a remote system accessible by the computing device over a communications link.

12. The non-transitory computer-readable medium of claim 10, wherein processing the access file further comprises determining the at least one identified data segment based on the metadata and the segmenting scheme information.

13. The non-transitory computer-readable medium of claim 10, wherein configuring the local storage further comprises:

obtaining the hash value for the at least one identified data segment based on the hashing scheme information and the hash identification information to yield an obtained hash value;

determining whether the at least one identified data segment is present in the local storage based on the obtained hash value;

in response to a determination that the at least one identified data segment is not present in the local storage, retrieving the at least one identified data segment from at least one location of the one or more locations specified in the access file; and storing the at least one identified data segment in the local storage.

14. A method, comprising:

in response to a request at a computing device for at least a portion of a data unit, determining whether a file system associated with the computing device is configured to service the request for the portion of the data unit by utilizing an access file and one or more data segments corresponding to the data unit instead of retrieving the data unit from the computing device, wherein:

the data unit is automatically selected for conversion to the one or more data segments based on one or more selection criteria selected from an access frequency of the data unit, an age of the data unit, or a size of the data unit, and the one or more data segments are generated based on the following segment generation criteria: a size criteria that specifies a size for the one or more data segments, and a segmenting criteria that specifies a number of bytes at which the data unit is to be segmented to generate each data segment of the one or more data segments; and in response to a determination that the file system is configured to service the request for the portion of the data unit by utilizing the access file and the one or more data segments corresponding to the data unit:

obtaining the access file corresponding to the data unit, the access file comprising:

metadata for the data unit, location information identifying one or more locations that store the one or more data segments defining one or more different portions of the data unit, wherein the one or more locations are specified by one or more trusted uniform resource locator (URL) strings, segmenting scheme information that specifies a configuration of the one or more data segments, hashing scheme information that specifies a type of hashing scheme used for a hash value associated with each data segment of the one or more data segments, and hash identification information based on the hash value associated with each data segment of the one or more data segments, identifying at least one data segment from the one or more data segments corresponding to the portion of the data unit to yield at least one identified data segment, based on the hash value associated with the at least one identified data segment and the location information in the access file, configuring a local storage of the computing device to comprise the at least one identified data segment, and servicing the request using data extracted from the at least one identified data segment in the local storage, wherein, prior to being configured to service the request by utilizing the access file and the one or more data segments, the file system was configured to service the request without utilizing the access file.

15. The method of claim 14, wherein configuring the local storage further comprises deleting one or more other data segments not currently in use responsive to the local storage having insufficient space for the at least one identified data segment.

16. The method of claim 15, wherein the one or more other data segments are selected for deletion based on at least a history of usage of the one or more other data segments at the computing device.

17. The method of claim 14, further comprising, when usage of the at least one identified data segment meets a use criterion:

reassembling the data unit at the computing device to yield a reassembled data unit, and servicing the request using the reassembled data unit, wherein the data unit is reassembled based on the access file.

18. A system, comprising:

a computing device comprising a file system that is configured to service a request for a data unit by utilizing an original access file and one or more data segments corresponding to the data unit instead of retrieving the data unit from the computing device, wherein:

the data unit is automatically selected for conversion to the one or more data segments based on one or more selection criteria selected from an access frequency of the data unit, an age of the data unit, or a size of the data unit, the one or more data segments are generated based on the following segment generation criteria: a size criteria that specifies a size for the one or more data segments, and a segmenting criteria that specifies a number of bytes at which the data unit is to be segmented to generate each data segment of the one or more data segments, and the file system is configured to control the computing device to perform steps that include:

accessing, via the original access file, at least one data segment of the one or more data segments storing data for the data unit to yield at least one accessed data segment, wherein the original access file comprises:
  metadata for the data unit,
  segmenting scheme information that specifies a configuration of the one or more data segments,
  hashing scheme information that specifies a type of hashing scheme used for a hash value associated with each data segment of the one or more data segments,
  hash identification information describing the hash value associated with each data segment of the one or more data segments, and
  location information identifying one or more locations of one or more resources at which the one or more data segments are located wherein the one or more locations are specified by one or more trusted uniform resource locator (URL) strings;
detecting that the at least one accessed data segment has been updated to yield at least one updated data segment;
generating an updated access file defining an updated data unit for the data unit based on a new hash value computed for the at least one updated data segment; and
reconfiguring the file system to service the request for the updated data unit using the updated access file,
wherein, prior to being configured to service the request by utilizing the original access file and the one or more data segments, the file system was configured to service the request without utilizing the original access file.

19. The system of claim 18, further comprising storing the at least one updated data segment in one location of the one or more locations.

20. The system of claim 18, further comprising storing the updated access file in a public location.

21. The system of claim 18, further comprising deleting the original access file from the computing device.

22. A system, comprising
  a processor;
  a first storage device;
  a second storage device having at least one data access metric value higher than a corresponding data access metric value for the first storage device; and
  a file system configured to manage the first storage device and the second storage device, wherein, responsive to a request from the processor for at least a portion of a data unit stored in the first storage device, the file system is configured to:
    determine whether the file system is configured to service the request for the portion of the data unit by utilizing an access file and one or more data segments corresponding to the data unit instead of retrieving the data unit, wherein:
      the data unit is automatically selected for conversion to the one or more data segments based on one or more selection criteria selected from an access frequency of the data unit, an age of the data unit, or a size of the data unit, and
      the one or more data segments are generated based on the following segment generation criteria: a size criteria that specifies a size for the one or more data segments, and a segmenting criteria that specifies a number of bytes at which the data unit is to be segmented to generate each data segment of the one or more data segments;
    in response to a determination that the file system is configured to service the request for the portion of the data unit by utilizing the access file and the one or more data segments corresponding to the data unit:
      obtain the access file corresponding to the data unit, the access file comprising:
        metadata for the data unit,
        location information identifying one or more locations in the first storage device storing the one or more data segments defining one or more different portions of the data unit, wherein the one or more locations are specified by one or more trusted uniform resource locator (URL) strings,
        segmenting scheme information that specifies a configuration of the one or more data segments,
        hashing scheme information that specifies a type of hashing scheme used for a hash value associated with each data segment of the one or more data segments, and
        hash identification information based on the hash value associated with each data segment of the one or more data segments,
      identify at least one data segment of the one or more data segments corresponding to the portion of the data unit to yield at least one identified data segment,
      based on the hash value associated with the at least one identified segment and the location information in the access file, configure the second storage device to comprise the at least one identified data segment, and
      service the request using data extracted from the at least one identified data segment in the second storage device,
    wherein, prior to being configured to service the request by utilizing the access file and the one or more data segments, the file system was configured to service the request without utilizing the access file.

23. The system of claim 22, wherein the file system is further configured to:
  delete one or more other data segments not currently in use responsive to the second storage device having insufficient space for the at least one identified data segment; and
  service a future request for the one or more other data segments not currently in use using the one or more data segments in the first storage device.

24. The system of claim 23, wherein, when at least some of the one or more other data segments not currently in use have been modified, the file system is further configured to:
  copy one or more modified data segments of the one or more other data segments not currently in use from the second storage device to the first storage device; and
  service a future request for a data unit associated with the one or more modified data segments using the first storage device.

25. The system of claim 22, wherein the first storage device is a magnetic disk drive and the second storage device is a solid-state disk drive.

* * * * *